(12) United States Patent
Correia

(10) Patent No.: US 10,634,146 B2
(45) Date of Patent: Apr. 28, 2020

(54) WATER PUMPING CONTROL DEVICE AND SYSTEM

(71) Applicant: SafeSump Inc., Collingwood (CA)

(72) Inventor: Daniel D. Correia, Wasaga Beach (CA)

(73) Assignee: SafeSump, Inc., Collingwood (CA)

( * ) Notice: Subject to any disclaimer, the term of this patent is extended or adjusted under 35 U.S.C. 154(b) by 259 days.

(21) Appl. No.: 15/793,438

(22) Filed: Oct. 25, 2017

(65) Prior Publication Data

US 2019/0120234 A1 Apr. 25, 2019

(51) Int. Cl.
| | |
|---|---|
| *F04D 15/02* | (2006.01) |
| *F04D 15/00* | (2006.01) |
| *F04D 13/14* | (2006.01) |
| *F04D 13/12* | (2006.01) |
| *F04D 13/08* | (2006.01) |
| *F04B 49/025* | (2006.01) |
| *F04B 49/06* | (2006.01) |
| *F04B 23/02* | (2006.01) |

(Continued)

(52) U.S. Cl.
CPC ........ *F04D 15/0218* (2013.01); *F04B 23/021* (2013.01); *F04B 23/04* (2013.01); *F04B 49/02* (2013.01); *F04B 49/025* (2013.01); *F04B 49/04* (2013.01); *F04B 49/065* (2013.01); *F04D 13/08* (2013.01); *F04D 13/12* (2013.01); *F04D 13/14* (2013.01); *F04D 15/00* (2013.01); *F04D 15/0066* (2013.01); *F04D 15/0072* (2013.01); *F04D 15/02* (2013.01); *F04D 15/029* (2013.01); *F04B 2203/0209* (2013.01)

(58) Field of Classification Search
CPC .......... F04D 13/08; F04D 13/12; F04D 13/14; F04D 15/00; F04D 15/0066; F04D 15/0072; F04D 15/02; F04D 15/029; F04D 15/0218; F04B 49/02; F04B 49/025; F04B 49/04; F04B 49/065; F04B 17/03; F04B 23/021; F04B 23/04; F04B 2203/0209
See application file for complete search history.

(56) References Cited

U.S. PATENT DOCUMENTS

| | | | | |
|---|---|---|---|---|
| 2,222,595 A | * | 11/1940 | Regester | ................. F04D 13/14 417/5 |
| 4,222,711 A | * | 9/1980 | Mayer | .................... F04B 49/06 417/36 |

(Continued)

*Primary Examiner* — Peter J Bertheaud
(74) *Attorney, Agent, or Firm* — Patentfile, LLC; Bradley C. Fach; Steven R. Kick

(57) ABSTRACT

A water pumping control device may include a primary power source and a secondary power source. The primary power source may be configured to provide a primary power input to a processing unit, and the secondary power source may be configured to provide a secondary power input to the processing unit. A primary pump and a secondary pump may be in communication with the processing unit, and the primary pump and the secondary pump may each be variable in speed. The primary pump and the secondary pump may each be in fluid communication with a sump so that when a pump is activated, the pump may remove water from the sump. A water level sensor may be in communication with the processing unit, and the water level sensor may be configured to provide a water level input describing a water level in the sump to the processing unit.

20 Claims, 6 Drawing Sheets

(51) Int. Cl.
*F04B 49/02* (2006.01)
*F04B 23/04* (2006.01)
*F04B 49/04* (2006.01)

(56) References Cited

U.S. PATENT DOCUMENTS

| | | | |
|---|---|---|---|
| 4,228,427 A * | 10/1980 | Niedermeyer | F04D 15/0077 340/623 |
| 4,369,438 A | 1/1983 | Wilhelmi | |
| 4,437,811 A * | 3/1984 | Iwata | F04D 15/029 417/36 |
| 7,429,842 B2 | 9/2008 | Schulman et al. | |
| 8,297,937 B2 | 10/2012 | Johnson | |
| 8,371,379 B2 * | 2/2013 | Parkinson | F04D 15/029 166/250.01 |
| 8,907,789 B2 | 12/2014 | Kochan et al. | |
| 9,157,434 B2 | 10/2015 | Leonard et al. | |
| 9,274,530 B1 | 3/2016 | Morris et al. | |
| 9,328,727 B2 | 5/2016 | Koehl | |
| 9,399,992 B2 | 7/2016 | Koehl | |
| 9,638,193 B2 * | 5/2017 | Bishop | F04B 17/06 |
| 9,885,360 B2 * | 2/2018 | Boese | F04B 17/06 |
| 9,920,766 B2 * | 3/2018 | Bishop | F04B 17/06 |
| 2005/0271517 A1 | 12/2005 | Terrell | |
| 2005/0281679 A1 * | 12/2005 | Niedermeyer | F04D 15/029 417/36 |
| 2008/0031751 A1 * | 2/2008 | Littwin | F04B 47/06 417/411 |
| 2009/0208345 A1 | 8/2009 | Moore et al. | |
| 2011/0311370 A1 * | 12/2011 | Sloss | F04B 47/02 417/1 |
| 2013/0108478 A1 * | 5/2013 | Parkinson | F04B 49/00 417/53 |
| 2014/0119947 A1 | 5/2014 | Bishop et al. | |
| 2014/0199180 A1 | 7/2014 | Schoendorff | |
| 2015/0143892 A1 | 5/2015 | Cummings | |

* cited by examiner

WATER PUMPING CONTROL DEVICE AND SYSTEM

FIELD OF THE INVENTION

This patent specification relates generally to the field of sump pumps and water management systems. More specifically, this patent specification relates to systems and devices that provide automated control of water pumping and removal.

BACKGROUND

A sump pump is a device that removes water from foundations of homes, pumping it to the exterior culvert of a building or into a storm sewer. This invention also applies to other types of dewatering pumps, such as, but not limited to, construction pit dewatering systems or pond management.

Current models are highly susceptible to failure. Many models do not protect against a power outage in the home. Traditional sump pumps rely on a mechanical "float" device to trigger the pump and measure the water level. Mechanical floats a highly prone to failure due to factors such as wear and tear on the connections, constant immersion in water causing seals to be penetrated, obstruction by objects such as pipes, or failure of mounting hardware.

In addition, once the float is mechanically triggered by a certain water level, traditional pumps have no speed modulation; the pump will turn on at maximum speed, and continue running at full power until the water level has dropped to the desired level, at which point it abruptly shuts off. This produces of great deal of noise. As a sump pump runs typically through the day and night, this can become irritating to residents.

Many municipalities do not currently have significant data and values on groundwater flow or rainwater absorption. If provided with this data and values, municipalities could better predict and visualize the flow of water, and make more educated planning decisions for infrastructure installations and upgrades.

In addition there is no below-ground water flow data available that can distinguish between water sources, such as rainwater, drinking water or ocean salt water. This reduces the ability for municipalities to accurately plan infrastructure installations and upgrades. Not having this data can also impede climate change research.

A large number of municipalities have areas prone to flooding caused by sump pumps in homes overloading the storm sewers or sewer systems in situations, at least in part due to the unmodulated nature of typical sump pumps. Most municipalities have no reliable data on below-ground water flow, thus no way to detect the numerous sump pumps attached to sanitary sewers. This practice is contrary to most building code and municipal regulations, yet continues to be a common alternative by frustrated homeowners in areas prone to flooding. During spring thaws, or storm events, the added strain of sump water in addition to regular sewer use and stormwater runoff, can cause the pressure in the treatment system to build up to the point that: the backflow-prevention check valves that are required by many building codes close, preventing sump pump systems from being effective and flooding basements; and municipalities are forced to release pressure on the treatment facility by bypassing a portion of the incoming stream and diverting it untreated.

Therefore a need exists for a novel systems and devices that provide automated control of water pumping and removal. A further need exists for novel systems and devices that provide automated control of water pumping and removal which are highly resistant to failure. There is also a need for novel systems and devices that provide automated control of water pumping and removal which are able to provide data and values on groundwater flow or rainwater absorption. Finally, a need exists for novel systems and devices that provide automated control of water pumping and removal which are configured to prevent overloading storm sewers or sewer systems as is typical for the unmodulated nature of existing sump pumps.

BRIEF SUMMARY OF THE INVENTION

A water pumping control device and system is provided which provides automated control of water pumping and removal. In some embodiments, the device may include a primary power source and a secondary power source. The primary power source may be configured to provide a primary power input to a processing unit, and the secondary power source may be configured to provide a secondary power input to the processing unit. A primary pump and a secondary pump may be in communication with the processing unit, and the primary pump and the secondary pump may each be variable in speed. The primary pump and the secondary pump may each be in fluid communication with a sump so that when a pump is activated, the pump may remove water from the sump. A water level sensor may be in communication with the processing unit, and the water level sensor may be configured to provide a water level input describing a water level in the sump to the processing unit. A radio module may enable wireless communication with one or more servers and/or client devices.

In further embodiments, the processing unit may be configured to activate the primary pump when the water level input reaches a threshold value.

In still further embodiments, the processing unit may be configured to increase the speed of the primary pump when the water level input reaches a threshold value and when the water level input is increasing.

In still further embodiments, the processing unit may be configured to activate the secondary pump when the water level input reaches the threshold value, when the water level input is increasing, and when the primary pump is at maximum speed.

According to another aspect consistent with the principles of the invention, a water pumping control system is provided. The system may include a water pumping control device may having a primary power source and a secondary power source. The primary power source may be configured to provide a primary power input to a processing unit, and the secondary power source may be configured to provide a secondary power input to the processing unit. A primary pump and a secondary pump may be in communication with the processing unit, and the primary pump and the secondary pump may each be variable in speed. The primary pump and the secondary pump may each be in fluid communication with a sump so that when a pump is activated, the pump may remove water from the sump. A water level sensor may be in communication with the processing unit, and the water level sensor may be configured to provide a water level input describing a water level in the sump to the processing unit. A radio module may be operable by the processing unit, and may enable wireless communication. The system may further include one or more client devices and/or servers, and radio module may the enable wireless communication with the one or more servers and/or client devices. The system may allow data to be exchanged between one or more water pumping control devices, servers, and client devices.

BRIEF DESCRIPTION OF THE DRAWINGS

Some embodiments of the present invention are illustrated as an example and are not limited by the figures of the accompanying drawings, in which like references may indicate similar elements and in which.

DETAILED DESCRIPTION OF THE INVENTION

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

Figure 1:
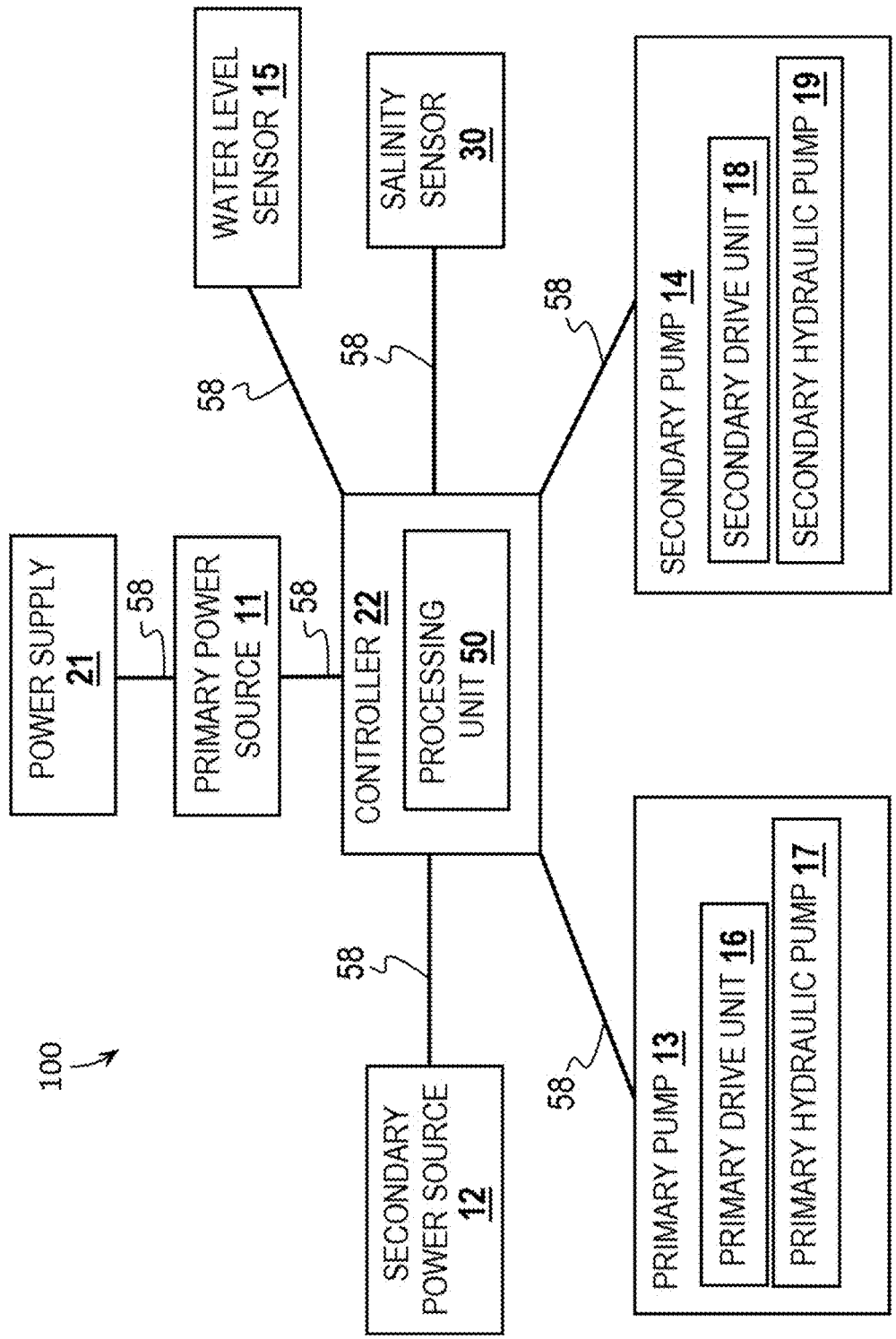
FIG. 1 depicts a block diagram of an example of a water pumping control device according to various embodiments described herein.

For purposes of description herein, the terms "upper", "lower", "left", "right", "rear", "front", "side", "vertical", "horizontal", and derivatives thereof shall relate to the invention as oriented in FIG. 1. However, one will understand that the invention may assume various alternative orientations and step sequences, except where expressly specified to the contrary. Therefore, the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Although the terms "first", "second", "primary", "secondary", etc. are used herein to describe various elements, these elements should not be limited by these terms. These terms are only used to distinguish one element from another element. For example, the first element may be designated as the second element, and the second element may be likewise designated as the first element without departing from the scope of the invention.

As used in this application, the term "about" or "approximately" refers to a range of values within plus or minus 10% of the specified number. Additionally, as used in this application, the term "substantially" means that the actual value is within about 10% of the actual desired value, particularly within about 5% of the actual desired value and especially within about 1% of the actual desired value of any variable, element or limit set forth herein.

New systems and devices that provide automated control of water pumping and removal are discussed herein. In the following description, for purposes of explanation, numerous specific details are set forth in order to provide a thorough understanding of the present invention. It will be evident, however, to one skilled in the art that the present invention may be practiced without these specific details.

The present disclosure is to be considered as an exemplification of the invention, and is not intended to limit the invention to the specific embodiments illustrated by the figures or description below.

The present invention will now be described by example and through referencing the appended figures representing preferred and alternative embodiments. FIG. 1 illustrates a block diagram of an example of a water pumping control device ("the device") 100 according to various embodiments. The device 100 may be configured to remove water from a sump 99, which is common to foundations of buildings, and pumping the water to an exterior culvert of the building, into a storm sewer, or the like. The device 100 may also function as other types of dewatering pumps, such as, but not limited to, construction pit dewatering systems and pond dewatering systems. In some embodiments, the device 100 may comprise a primary power source 11 which may be configured to provide a primary power input to a processing unit 50. A secondary power source 12 may be configured to provide a secondary power input to the processing unit 50. A primary pump 13 and a secondary pump 14 may be in communication with the processing unit 50, and the primary pump 13 and the secondary pump 14 may each be variable speed. The primary pump 13 and the secondary pump 14 may each be in fluid communication with a sump 99 so that when a pump 13, 14, is activated, the pump 13, 14, may remove water from the sump 99. A water level sensor 15 may be in communication with the processing unit 50, and the water level sensor 15 may be configured to provide a water level input describing a water level in the sump 99 to the processing unit 50. In some embodiments, the processing unit 50 may be configured to activate the primary pump 13 when the water level input reaches a threshold value. In further embodiments, the processing unit 50 may be configured to increase the speed of the primary pump 13 when the water level input reaches a threshold value and when the water level input is increasing. In still further embodiments, the processing unit 50 may be configured to activate the secondary pump 14 when the water level input reaches the threshold value, when the water level input is increasing, and when the primary pump 13 is at maximum speed.

Figure 2:
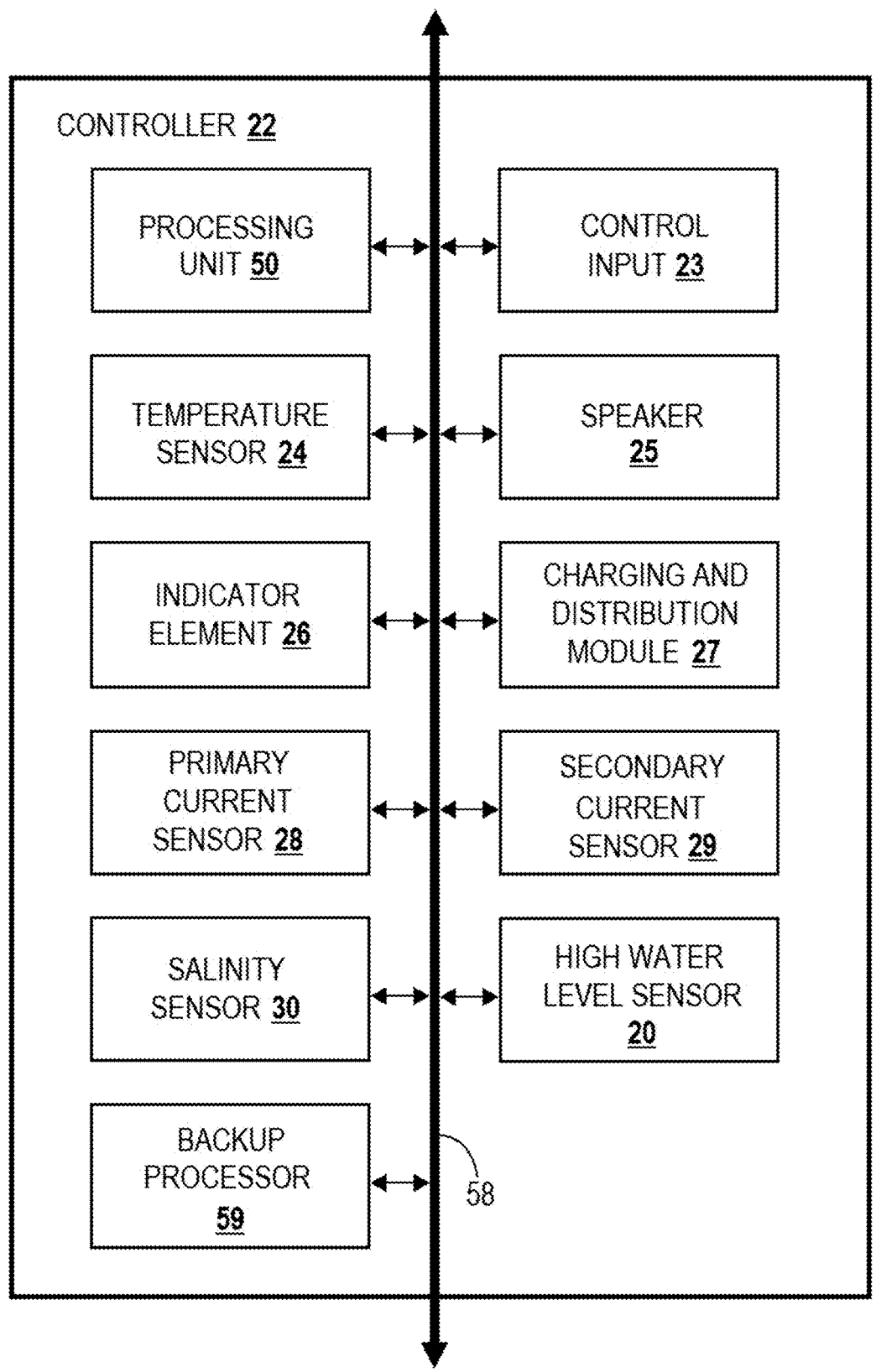
FIG. 2 illustrates a block diagram of an example of a controller of a water pumping control device according to various embodiments described herein.
Figure 3:
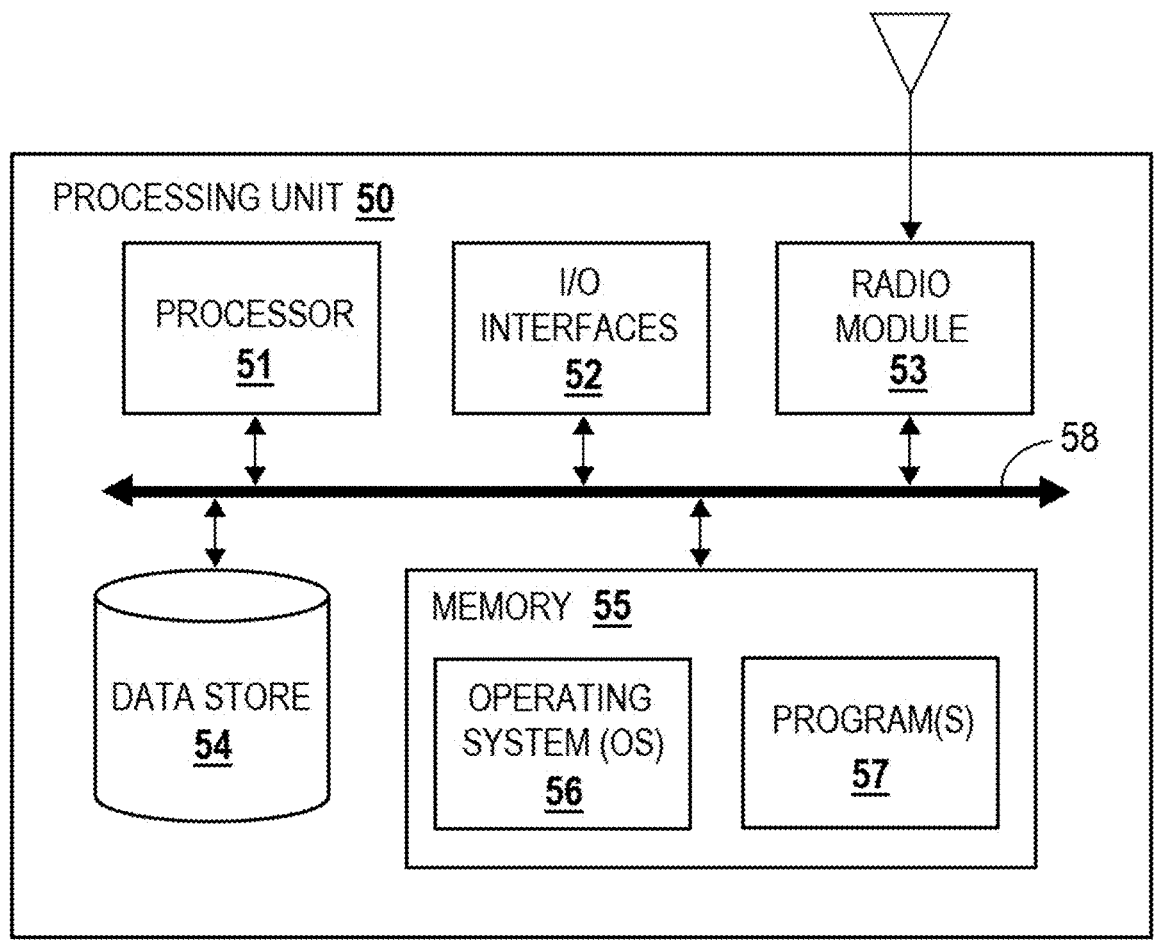
FIG. 3 shows a block diagram of an example of a processing unit of a water pumping control device according to various embodiments described herein.

A block diagram of an example of a water pumping control device 100 is depicted in FIG. 1. In some embodiments, the device 100 may comprise one, two, three, four, or more pumps 13, 14, which may be configured to remove water that has accumulated in a sump 99 or other water holding fixture. Preferably, each pump 13, 14 may comprise a drive unit and a hydraulic pump. Fluid communication between a pump 13, 14, and a sump 99 or other water holding fixture may be achieved with any type of pipe or conduit 98, such as Poly Vinyl Chloride (PVC) pipe and fittings, Chlorinated Poly Vinyl Chloride (CPVC) pipe and fittings, cross-linked polyethylene (PEX) pipe and fittings, galvanized pipe and fittings, black pipe and fittings, polyethylene pipe and fittings, copper pipe and fittings, brass pipe and fittings, stainless steel or other steel alloy pipe and fittings, vinyl pipe and fittings, or any other type of pipe or conduit 98. Generally, water removed via a pump 13, 14, may be transferred to a desired location via pipe or conduit 98, such as to an exterior culvert of a building or into a storm sewer. It should be appreciated by those of ordinary skill in the art that FIGS. 1-3 depict the water pumping control device 100 in an oversimplified manner, and a practical embodiment may include additional components and suitably configured processing logic to support known or conventional operating features that are not described in detail herein.

In preferred embodiments, the device 100 may comprise a primary pump 13 and a secondary pump 14. A primary pump 13 may comprise a primary drive unit 16 and a primary hydraulic pump 17. The primary drive unit 16 may be in electronic communication with the processing unit 50 and may comprise an electrically operated motor. In preferred embodiments, a primary drive unit 16 may comprise a direct current (DC) motor, while in other embodiments, a primary drive unit 16 may comprise an alternating current (AC) motor or any other type of electrically operated motor. In further preferred embodiments, the primary drive unit 16 may be variable in speed thereby allowing the primary hydraulic pump 17, and therefore the primary pump 13, to operate at two, three, four, five, six, seven, or more, such as a plurality of water pumping speeds. The primary drive unit 16 may be configured to operate the primary hydraulic pump 17 at a maximum speed which may describe a water pumping speed that the primary drive unit 16 and/or primary hydraulic pump 17 may not exceed. A primary hydraulic pump 17 may comprise any pump operable by a primary drive unit 16 which is suitable for pumping or transferring water, such as a gear pump, rotary vane pump, screw pump, bent axis pump, inline axial piston pumps and swashplate principle pumps, radial piston pumps, peristaltic pumps, or any other suitable type of fluid pressuring pump.

A secondary pump 14 may comprise a secondary drive unit 18 and a secondary hydraulic pump 19. The secondary drive unit 18 may be in electronic communication with the processing unit 50 and may comprise an electrically operated motor. In preferred embodiments, a secondary drive unit 18 may comprise a direct current (DC) motor, while in other embodiments, a secondary drive unit 18 may comprise an alternating current (AC) motor or any other type of electrically operated motor. In further preferred embodiments, the secondary drive unit 18 may be variable in speed thereby allowing the secondary hydraulic pump 19, and therefore the secondary pump 14, to operate at two, three, four, five, six, seven, or more, such as a plurality of water pumping speeds. The secondary drive unit 18 may be configured to operate the secondary hydraulic pump 19 at a maximum speed which may describe a water pumping speed that the secondary drive unit 18 and/or secondary hydraulic pump 19 may not exceed. A secondary hydraulic pump 19 may comprise any pump operable by a primary drive unit 16 which is suitable for pumping or transferring water, such as a gear pump, rotary vane pump, screw pump, bent axis pump, inline axial piston pumps and swashplate principle pumps, radial piston pumps, peristaltic pumps, or any other suitable type of fluid pressuring pump.

In some embodiments, the device 100 may comprise one, two, three, four, or more power sources, such as a primary power source 11 and a secondary power source 12. In some embodiments, a primary power source 11 may be in communication with an alternating current power supply 21. The primary power source 11 may receive electrical power from the power supply 21 and communicate the power to the processing unit 50 and/or any other element of the device 100 that may require electrical power. In some embodiments, the primary power source 11 may comprise a power converter which may convert AC power from the power supply 21 into DC power and the primary power source 11 may communicate DC power to the processing unit 50 and/or any other element of the device 100 that may require electrical power. In other embodiments, the primary power source 11 may communicate AC power to the processing unit 50 and/or any other element of the device 100 that may require electrical power.

In some embodiments, a secondary power source 12 may be in communication the primary power source 11 so that electrical power from the primary power source 11 may be communicated to the secondary power source 12. In preferred embodiments, a secondary power source 12 may comprise a battery, such as a lithium ion battery, nickel cadmium battery, alkaline battery, or any other suitable type of battery, a fuel cell, a capacitor, a super capacitor, or any other type of energy storing and/or electricity releasing device preferably configured to provide DC electrical power. In further embodiments, a secondary power source 12 may comprise or be in communication with a charging and distribution module 27 which may be configured to control the recharging of the secondary power source 12, discharging of the secondary power source 12, and/or distribution of power to one or more components of the device 100 that may require electrical power.

The device 100 may comprise one or more water level sensors 15. A water level sensor 15 may be configured to measure the level of water in a sump 99 that a pump 13, 14, of the device 100 is in fluid communication with and to provide the water level measurements as water level input to the processing unit 50. By periodically or continuously measuring the level of water in a sump 99, the water level sensor 15 and/or the processing unit 50 may determine if the water level in the sump 99 is decreasing, remaining the same, or increasing.

Referring to both FIGS. 1 and 2, in some embodiments, the device 100 may comprise one or more high water level sensors 20. A high water level sensor 20 may be an additional sensor to a water level sensor 15 and may be configured to provide data to the processing unit 50 and/or a backup processing unit 59 indicating if the water level in a sump 99 rises above a safe level, such as which may be caused by software or hardware failure. In preferred embodiments, a high water level sensor 20 may comprise two corrosion resistant electrodes that may be placed in a sump 99 above the regular water level. The resistance between the two electrodes may be measured by the processor 50 of the processing unit 50 and/or by a backup processor 59, and if the resistance is dropped beyond a certain threshold, this may indicate that water has reached the high water level sensor 20, and the secondary pump 14 may then be engaged by the processor 50 of the processing unit 50 and/or by a backup processor 59. By periodically or continuously measuring the level of water in a sump 99, a high water level sensor 20, backup processor 59, and/or the processing unit 50 may determine if the water level in the sump 99 is decreasing, remaining the same, or increasing.

In some embodiments, a water level sensor 15 and/or a high water level sensor 20 may comprise an ultrasonic water level sensor which may generally be configured to generate high frequency sound waves and evaluate the echo which is received back by the sensor, measuring the time interval between sending the signal and receiving the echo to determine the distance to an object such as the water level surface within a sump 99. In other embodiments, a water level sensor 15 and/or a high water level sensor 20 may comprise a proximity sensor which may include any type of sensor which is able to provide information which describes the distance between the portions of the water level sensor 15 and/or a high water level sensor 20 and a water level surface that the water level sensor 15 and/or a high water level sensor 20 is directed towards. Proximity sensors may include sensors such as fixed (single beam) or rotating (sweeping) Time-of-Flight (TOF) or structured light based laser rangefinders, 3D High Definition LiDAR, 3D Flash LIDAR, 2D or 3D sonar sensors and one or more 2D cameras. Further, a proximity sensor may also include Passive thermal infrared sensors, Photocell or reflective sensors, Radar sensors, Reflection of ionising radiation sensors, Sonar sensors, such as active or passive, Ultrasonic sensors, Fiber optics sensors, Hall effect sensors, or any other sensor able to detect the presence of nearby objects and surfaces without any physical contact.

FIG. 2 illustrates a block diagram of an example of a controller 22 of a water pumping control device 100 according to various embodiments described herein. In some embodiments, the device 100 may comprise a controller 22 which may provide a structure for housing or aggregating one or more components of the device 100. Preferably, a processing unit 50 may be housed in or otherwise coupled to a controller 22. A controller 22 may be formed from or comprise any suitable material including steel alloys, aluminum, aluminum alloys, copper alloys, any other type of metal or metal alloy, any type of ceramic, earthenware, natural stone, synthetic stone, various types of hard plastics, such as polyethylene (PE), Ultra-high-molecular-weight polyethylene (UHMWPE, UHMW), polypropylene (PP) and polyvinyl chloride (PVC), polycarbonate, nylon, Poly (methyl methacrylate) (PMMA) also known as acrylic, melamine, hard rubbers, fiberglass, carbon fiber, resins, such as epoxy resin, wood, other plant based materials, or any other material including combinations of materials that are substantially rigid. Additionally, a controller 22 may be configured in any shape and size.

In some embodiments, the device 100 may comprise one or more processing units 50, control inputs 23, temperature sensors 24, speakers 25, status indicators 26, charging and distribution modules 27, primary current sensors 28, secondary current sensors 29, and salinity sensors 30 which may optionally be housed in the controller 22. The components and elements (50, 23, 24, 25, 26, 27, 28, 29, and 30) may be communicatively coupled via one or more local interfaces 58. A local interface 58 can be, for example but not limited to, one or more buses, wiring harnesses, circuit boards, or other wired or wireless connections, as is known in the art. A local interface 58 can have additional elements, which are omitted for simplicity, such as controllers, buffers (caches), drivers, repeaters, and receivers, among many others, to enable communications. Further, a local interface 58 may include address, control, and/or data connections to enable appropriate communications among the aforementioned components.

In some embodiments, the device 100 may comprise one or more control inputs 23 that a user 201 may interact with, such as turnable control knobs, depressible button type switches, a key pad, slide type switches, rocker type switches, touch screen graphical user interfaces (GUI), or any other suitable input that may be used to modulate electricity between components or to otherwise control functions of the device 100.

In some embodiments, the device 100 may comprise a temperature sensor 24 which may be configured to provide temperature data to the processing unit 50 which may describe the temperature of water in a sump 99 that the pumps 13, 14, may be in fluid communication with. In further embodiments, a temperature sensor 24 may be configured to provide temperature data to the processing unit 50 which may describe the temperature of an element of the device 100. A temperature sensor 24 may comprise a thermocouple, a resistive temperature device (RTDs, thermistors), an infrared temperature sensor, a bimetallic device, a liquid expansion device, a molecular change-of-state device, a silicon diode, or any other type of temperature sensor configured to electrically communicate temperature information.

In some embodiments, the device 100 may comprise a speaker 25 which may be used to produce a plurality of sounds at a plurality of volume levels. Preferably, a speaker 25 may be configured to produce sounds which may be used to audibly appraise a user 201 of the status of one or more elements of the device 100 and/or of one or more conditions that the device 100 is in. For example, if water is rising in the sump 99 faster than either or both pumps 13, 14, can remove it, the processing unit 50 may cause the speaker to emit a siren or other warning sound. A speaker 25 may comprise a buzzer, a piezoelectric sound producing device, a dielectric elastomer sound producing device, a buzzer, a moving coil loudspeaker, an electrostatic loudspeaker, an isodynamic loudspeaker, a piezo-electric loudspeaker, or any other device capable of producing one or more sounds.

In some embodiments, the device 100 may comprise an indicator element 26 which may be configured to visually apprise a user 201 of the status of one or more elements of the device 100 and/or of one or more conditions that the device 100 is in. For example, if all elements of the device 100 are working properly, a light emitting type of indicator element 26, such as a LED light, may be operated by the processing unit to emit green light. As another example, an indicator element 26 may be configured to visually apprise a user 201 of the status or charge level of a secondary power source 12. To provide visual information to a user 201, embodiments of an indicator element 26 can be implemented with one or more light emitting elements or other display devices, e.g., a LED (light emitting diode) display or LCD (liquid crystal display) monitor, for displaying information. Optionally, an indicator element 26 and a control input 23 may be combined together as a touch screen graphical user interface (GUI) or the like.

In some embodiments, the device 100 may comprise one or more current sensors, such as a primary current sensor 28 and a secondary current sensor 29, which may be configured to monitor the amount of electrical current being drawn by an element of the device 100, such as the pumps 13, 14. In preferred embodiments, a primary pump 13 may comprise or be in communication with a primary current sensor 28 and a secondary pump 14 may comprise or be in communication with a secondary current sensor 29. Each current sensor 28, 29, may detect electric current (AC or DC) in a wire, and may generate a signal proportional to that current which may be communicated to the processing unit 50. The generated signal could be analog voltage or current or even a digital output. The generated signal can be then used to display the measured current in an ammeter, or can be stored for further analysis in a data acquisition system, or can be used for the purpose of control. A current sensor 28, 29, may comprise a Hall effect IC sensor, a Transformer or current clamp meter, a Fluxgate Transformer Type, a Resistor, whose voltage is directly proportional to the current through it, a Fiber optic current sensor, using an interferometer to measure the phase change in the light produced by an electric field, a Rogowski coil, or any other suitable device that detects electric current.

In some embodiments, the device 100 may comprise a salinity sensor 30 which may be configured to provide salinity data to the processing unit 50 which may describe the salinity of water in a sump 99 that the pumps 13, 14, may be in fluid communication with. A salinity sensor 30 may comprise an electrode conductivity sensor which measures the ability of a solution to conduct an electric current between two electrodes, an inductive sensor, such as an electrodeless conductivity sensor which measures the current flow between inductive coils, or any other type of salinity sensor configured to electrically communicate water salinity information.

In some embodiments, the device 100 may comprise a backup processor 59 in addition to a processor 51. The backup processor 59 is a hardware device for executing software instructions. The backup processor 59 can be any custom made or commercially available processor, a central processing unit (CPU), an auxiliary processor among several processors associated with the backup processor 59, a semiconductor-based microprocessor (in the form of a microchip or chip set), or generally any device for executing software instructions. When the backup processor 59 is in operation, it may be configured to execute software stored within the memory 55, to communicate data to and from the memory 55, and to generally control operations of the device 100 pursuant to the software instructions. In an exemplary embodiment, the backup processor 59 may include a mobile optimized processor such as optimized for power consumption and mobile applications. In preferred embodiments, a backup processor 59 may comprise a very simple "backup" microprocessor which may be configured to simply process data from the high water level sensor 20 as well monitor the primary processor 51 and/or processing unit 50. The backup processor 59 may be configured to operate and control the pumps 13, 14, in the event of catastrophic hardware or software failure.

FIG. 3 shows a block diagram of an example of a processing unit 50 of a water pumping control device 100 according to various embodiments described herein. In some embodiments and in the present example, the device 100 can be a digital device that, in terms of hardware architecture, comprises a processing unit 50 which generally includes a processor 51, input/output (I/O) interfaces 52, an optional radio module 53, a data store 54, and memory 55. It should be appreciated by those of ordinary skill in the art that FIG. 3 depicts the processing unit in an oversimplified manner, and a practical embodiment may include additional components or elements and suitably configured processing logic to support known or conventional operating features that are not described in detail herein. The components and elements (51, 52, 53, 54, and 55) are communicatively coupled via a local interface 58.

The processor 51 is a hardware device for executing software instructions. The processor 51 can be any custom made or commercially available processor, a central processing unit (CPU), an auxiliary processor among several processors associated with the processing unit 50, a semiconductor-based microprocessor (in the form of a microchip or chip set), or generally any device for executing software instructions. When the processing unit 50 is in operation, the processor 51 is configured to execute software stored within the memory 55, to communicate data to and from the memory 55, and to generally control operations of the device 100 pursuant to the software instructions. In an exemplary embodiment, the processor 51 may include a mobile optimized processor such as optimized for power consumption and mobile applications.

The I/O interfaces 52 can be used to receive and record environmental information, may comprise one or more expansion ports for additional sensors, to receive user input from a control input 23 and/or for providing system output through an indicator element 26. The I/O interfaces 52 can also include, for example, a serial port, a parallel port, a small computer system interface (SCSI), an infrared (IR) interface, a radio frequency (RF) interface, a universal serial bus (USB) interface, and the like.

A radio module 53 enables wireless communication to an external access device or network. In preferred embodiments, a radio module 53 may operate via WiFi communication standards. In further embodiments, a radio module 53 may operate on a cellular band and may communicate with or receive a Subscriber Identity Module (SIM) card or other wireless network identifier. Any number of suitable wireless data communication protocols, techniques, or methodologies can be supported by the radio module 53, including, without limitation: RF; IrDA (infrared); Bluetooth; ZigBee (and other variants of the IEEE 802.15 protocol); IEEE 802.11 (any variation); IEEE 802.16 (WiMAX or any other variation); Direct Sequence Spread Spectrum; Near-Field Communication (NFC); Frequency Hopping Spread Spectrum; Long Term Evolution (LTE); cellular/wireless/cordless telecommunication protocols (e.g. 3G/4G, etc.); wireless home network communication protocols; paging network protocols; magnetic induction; satellite data communication protocols; wireless hospital or health care facility network protocols such as those operating in the WMTS bands; GPRS; proprietary wireless data communication protocols such as variants of Wireless USB; and any other protocols for wireless communication.

Figure 4:
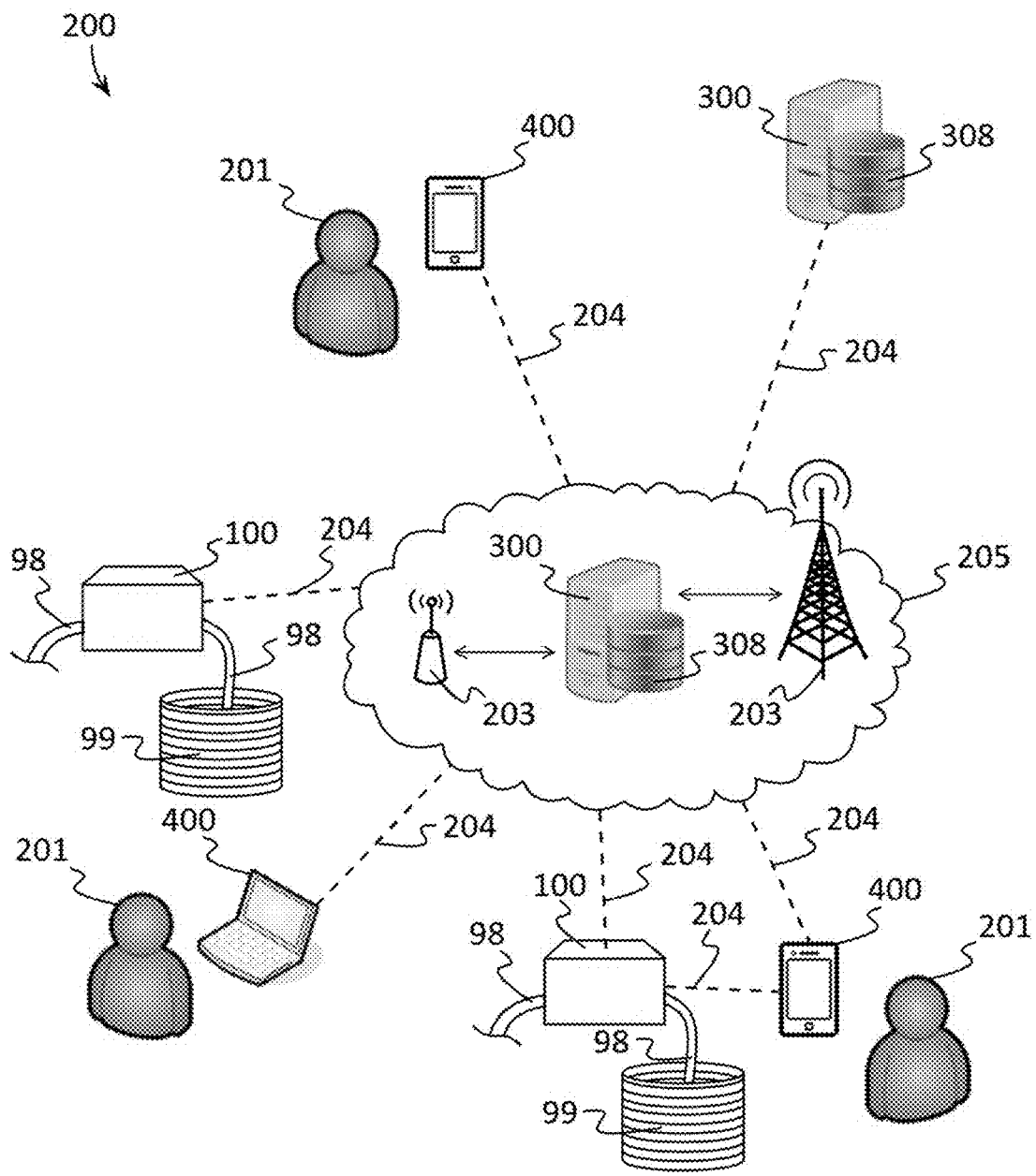
FIG. 4 depicts an illustrative example of some of the components and computer implemented methods which may be found in a water pumping control system according to various embodiments described herein.

The radio module 53 may be configured to wirelessly transmit data to one or more client devices 400 (FIGS. 4 and 6) and/or servers 300 (FIGS. 4 and 5) via a network connection 204 (FIG. 4) with a wired or wireless network 205 (FIG. 4). In this manner, the processing unit 50 may send and receive data with the one or more client devices 400 and/or servers 300 via the radio module 53.

In some embodiments, the processing unit 50 may be configured to wirelessly transmit data to one or more client devices 400 and/or servers 300 describing a power source 11, 12, failure when a power input from the primary power source 11 and/or a power input from the secondary power source 12 is not provided to the processing unit 50. This may allow a client device 400 of a user 201 and/or a server 300 to receive a notification of a power source 11, 12, failure and information describing the failure, such as the time of failure, duration of failure, water level in a sump 99 during the failure, temperature data, salinity data, or any other information that an element of the device 100 may be able to provide to the processing unit 50.

In some embodiments, the processing unit 50 may be configured to wirelessly intransmit data to one or more client devices 400 and/or servers 300 describing a pump 13, 14, failure the primary pump 13 and/or the secondary pump 14 is not in communication with the processing unit 50 or otherwise unable to pump water. This may allow a client device 400 of a user 201 and/or a server 300 to receive a notification of a pump 13, 14, failure and information describing the failure, such as the time of failure, duration of failure, water level in a sump 99 during the failure, temperature data, salinity data, or any other information that an element of the device 100 may be able to provide to the processing unit 50.

In some embodiments, the processing unit 50 may be configured to wirelessly transmit data to one or more client devices 400 and/or servers 300 describing the water level input received from a water level sensor 15 and/or describing pump speed data for the primary pump 13 and/or the secondary pump 14. This may allow a client device 400 of a user 201 and/or a server 300 to receive a notification of the water level in a sump 99 or changes in the water level in a sump 99 versus the speed of one or both pumps 13, 14. For example, if one or both pumps 13, 14, are operating at maximum speed and the water level in the sump 99 is not receding or increasing, the processing unit may send a notification to the client device 400 of a user 201 preferably with information describing the water level data and the pump 13, 14, speed.

The data store 54 may be used to store data. The data store 54 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 54 may incorporate electronic, magnetic, optical, and/or other types of storage media.

The memory 55 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 55 may incorporate electronic, magnetic, optical, and/or other types of storage media. Note that the memory 55 may have a distributed architecture, where various components are situated remotely from one another, but can be accessed by the processor 51. The software in memory 55 can include one or more software programs, each of which includes an ordered listing of executable instructions for implementing logical functions.

In the example of FIG. 3, the software in the memory system 55 includes a suitable operating system (O/S) 56 and programs 57. The operating system 56 essentially controls the execution of input/output interface 52 functions, and provides scheduling, input-output control, file and data management, memory management, and communication control and related services. The operating system 56 may be, for example, LINUX (or another UNIX variant), Android (available from Google), Symbian OS, Microsoft Windows CE, Microsoft Windows 7 Mobile, iOS (available from Apple, Inc.), webOS (available from Hewlett Packard), Blackberry OS (Available from Research in Motion), Raspbian (available from the Raspberry Pi Foundation) and the like. The programs 57 may include various applications, add-ons, etc. configured to provide end user functionality with the device 100. For example, exemplary programs 57 may include, but not limited to, environmental variable analytics and modulation of input/output interface 52 functions. In a typical example, the end user typically uses one or more of the programs 57 to control functions of the device 100 and to control the amount of water in a sump 99 that the device 100 is in fluid communication with.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

The processing unit 50 may also include a main memory, such as a random access memory (RAM) or other dynamic storage device (e.g., dynamic RAM (DRAM), static RAM (SRAM), and synchronous DRAM (SDRAM)), coupled to the bus for storing information and instructions to be executed by the processor 51. In addition, the main memory may be used for storing temporary variables or other intermediate information during the execution of instructions by the processor 51. The processing unit 50 may further include a read only memory (ROM) or other static storage device (e.g., programmable ROM (PROM), erasable PROM (EPROM), and electrically erasable PROM (EEPROM)) coupled to the bus for storing static information and instructions for the processor 51.

In some embodiments, the processing unit 50 may be configured to control which power input may be provided to a pump 13, 14, or to any other electrical element of the device 100. In further embodiments, the processing unit 50 may be configured to provide a secondary power input from the secondary power source 12 to the primary pump 13 and/or to the secondary pump 14 when the primary power source 11 is not providing a primary power input to the processing unit 50. In still further embodiments, when the primary power source 11 is not providing a primary power input to the processing unit 50, the processing unit 50 and any other electrical element of the device 100 may operate using the secondary power input from the secondary power source 12. In this manner, the secondary power source 12 may function as a fail-safe power source should an AC power supply 21 fail and/or the primary power source 11 fail to provide a primary power input.

In some embodiments, the processing unit 50 may be configured to control the speed of the pumps 13, 14, to prevent freezing of water in a sump 99 that the device 100 is in fluid communication with and/or to prevent freezing of water in the primary 13 or secondary 14 pumps. In preferred embodiments, the processing unit 50 may receive temperature data from a temperature sensor 24 which may indicate that the temperature sensor 24 is measuring temperatures close to freezing (32 degrees Fahrenheit plus or minus 5 degrees) or temperatures below freezing (below 33 degrees Fahrenheit) and the processing unit 50 may cause the primary pump 13 and/or the secondary pump 14 to pulse to prevent freezing of water in the sump 99, pumps 13, 14, or piping and conduits 98.

In some embodiments, the processing unit 50 may be configured to match the pumping speed of pump(s) 13, 14 to incoming water flow rate of a sump 99 by: measuring the water level continuously using a water level sensor 15; deriving the water flow rate into the sump 99 from data from the water level sensor 15 and the past pump(s) 13, 14, pumping speed; deriving the required pump(s) 13, 14, speed from a mathematical model with the flow rate and other variables as inputs; and adjusting drive unit(s) 16, 17, of the pump(s) 13, 14, to match. This minimizes noise, wear and tear on the pumps 13, 14, and optimizes power drawn or used by the device 100. In further embodiments, the processing unit 50 may send water level data, flow rate data, power draw data, and other data to a server 300 and/or client device 400 via a radio module 53 and a network connection 204. In further embodiments, the processing unit 50 may retrieve stored device 100 settings from a server 300 and/or client device 400 via a radio module 53 and a network connection 204. This allows users 201 and other entities such as municipalities to control pumps 13, 14, and other functions remotely, such as in emergency situations. In further embodiments, the processing unit 50 may constantly monitor power source 11, 12, voltage, power supply 21 voltage, pump 13, 14, current usage, and other device 100 variables. In further embodiments, the processing unit 50 may switch the device 100 from using a primary power input from a primary power source 11 to using a secondary power input from a secondary power source 12 if the primary power input is lost. In further embodiments, the processing unit 50 may maintains the secondary power source 12 voltage with a constant-current/constant-voltage charging and distribution module 27. In further embodiments, the processing unit 50 may constantly measure the current draw from a pump(s) 13, 14, and compares it with an internal model of the current flow at that speed and duty cycle to determine the wear state of the pump(s) 13, 14.

In still further embodiments, the processing unit 50 may be configured to react to situations with pre-programmed conditions as detailed in Table 1.

TABLE 1

Table of failure modes handled, and reactions processed by the processing unit 50.

| Failure mode | Detection | Action |
| --- | --- | --- |
| Power supply 21 goes out/ primary power source 11 fails | primary power input voltage drops | Switch to secondary power source 12, send notification to client device 400 |
| Primary pump 13 fails | Overcurrent/undercurrent/high water level | Cycle secondary pump 14, send notification to client device 400 |
| Secondary pump 14 fails | High water level | Re-test primary pump 13, send notification to client device 400 |
| Network connection 204 fails | Wifi drops out | Send notification to client device 400, and processing unit 50 attempts to reconnect while running normally |
| Obstructed pipe | Slight overcurrent, high water level | Send notification to client device 400, attempt to pulse pump(s) 13, 14 |
| High water flow rate | High tested flow rate | Send notification to client device 400, activate pump(s) 13, 14 to lower water level |
| Secondary power source 12 | No battery voltage, no battery current when charging | Activate charging and distribution module 27, send notification to client device 400 |
| Water level sensor 15 fails | Negative water level, returned value standard deviation, tripped float | Activate primary pump 13 at 100%, activate secondary pump 14 |
| Failure of Main processor 51 | High water level, backup processor watchdog pulse program activated | Backup processor 59 activates secondary pump 14; sends notification to client device 400 |

TABLE 1-continued

Table of failure modes handled, and reactions processed by the processing unit 50.

| Failure mode | Detection | Action |
| --- | --- | --- |
| Primary pump 13 drive unit 16 circuit failure | Low current; current deviation on channel; high water level | Primary processor 50 activates secondary pump 14; sends notification to client device 400 |
| Secondary pump 14 drive unit 18 circuit failure | Low current; current deviation on channel; high water level | Primary processor 50 activates primary pump 13; sends notification to client device 400 |

While some materials have been provided, in other embodiments, the elements that comprise the device 100 such as the primary pump 13, secondary pump 14, optional controller 22, and/or any other element discussed herein may be made from durable materials such as aluminum, steel, other metals and metal alloys, wood, hard rubbers, hard plastics, fiber reinforced plastics, carbon fiber, fiberglass, resins, polymers or any other suitable materials including combinations of materials. Additionally, one or more elements may be made from or comprise durable and slightly flexible materials such as soft plastics, silicone, soft rubbers, or any other suitable materials including combinations of materials. In some embodiments, one or more of the elements that comprise the device 100 may be coupled or connected together with heat bonding, chemical bonding, adhesives, clasp type fasteners, clip type fasteners, rivet type fasteners, threaded type fasteners, other types of fasteners, or any other suitable joining method. In other embodiments, one or more of the elements that comprise the device 100 may be coupled or removably connected by being press fit or snap fit together, by one or more fasteners such as hook and loop type or Velcro® fasteners, magnetic type fasteners, threaded type fasteners, sealable tongue and groove fasteners, snap fasteners, clip type fasteners, clasp type fasteners, ratchet type fasteners, a push-to-lock type connection method, a turn-to-lock type connection method, a slide-to-lock type connection method or any other suitable temporary connection method as one reasonably skilled in the art could envision to serve the same function. In further embodiments, one or more of the elements that comprise the device 100 may be coupled by being one of connected to and integrally formed with another element of the device 100.

FIG. 4 depicts an illustrative example of some of the components and computer implemented methods which may be found in a water pumping control system 200 according to various embodiments described herein. The system 200 is configured to facilitate the transfer of data and information between one or more water pumping control devices 100, access points 203, client devices 400, and servers 300 over a data network 205. Each client device 400 may send data to and receive data from the data network 205 through a network connection 204 with an access point 203. A data store 308 accessible by the server 300 may contain one or more databases. The data may comprise any information pertinent to one or more users 201 input into the system 200 including information on or describing one or more users 201, information on or describing one or more water pumping control devices 100, information collected by one or more water pumping control devices 100, information requested by one or more users 201, information supplied by one or more users 201, and any other information such as hydrological information.

In this example, the system 200 may comprise one or more client devices 400 (but preferably more than two client devices 400) configured to be operated by one or more users 201. Client devices 400 can be mobile devices, such as laptops, tablet computers, personal digital assistants, smart phones, and the like, that are equipped with a wireless network interface or radio capable of sending data to one or more water pumping control devices 100, other client devices 400, and servers 300 with access to one or more data stores 308 over a network 205 such as a wireless local area network (WLAN). Additionally, client devices 400 can be fixed devices, such as desktops, workstations, and the like, that are equipped with a wireless or wired network interface capable of data to one or more water pumping control devices 100, other client devices 400, and servers 300 with access to one or more data stores 308 over a wireless or wired local area network 205. The system 200 may be implemented on at least one client device 400 and/or server 300 programmed to perform one or more of the steps described herein. In some embodiments, more than one client device 400 and/or server 300 may be used, with each being programmed to carry out one or more steps of a method or process described herein.

The radio module 53 of a water pumping control device 100 may be configured to wirelessly transmit data to one or more client devices 400 and/or servers 300 via a network connection 204 with a wired or wireless network 205. In this manner, the processing unit 50 of a water pumping control device 100 may send and receive data with the one or more client devices 400 and/or servers 300 via the radio module 53. Preferably, a device 100 may transmit data to one or more client devices 400 and/or servers 300 which may include: current status alerts of one or more elements; pump 13, 14, speed, optionally in percent format; pump 13, 14, hours run; pump 13, 14, current draw; pump 13, 14, cycles per unit of time; power source 11, 12, voltage; secondary power source 12 or battery health, secondary power source 12 or battery estimated hours safe backup time at current usage; current and/or past water level data; current and/or past water flow rate; current and/or past water temperature; current and/or past water salinity; and/or any other data that one or more elements of the device 100 may be configured to provide or that the processing unit 50 may be capable of computing.

In some embodiments of the system 200, a water pumping control device 100 may send and receive data directly with the one or more client devices 400 via the radio module 53 and/or send and receive data directly with the one or more servers 300 via the radio module 53. In further embodiments of the system 200, a water pumping control device 100 may send and receive data to one or more client devices 400 and/or servers 300 via the radio module 53 via one or more other client devices 400 and/or servers 300 via the radio module 53.

A client device 400 may send and receive data with a water pumping control device 100 via cellular messaging, email messaging, phone calls, or any other type of electronic messaging, through a WiFi network, cellular network, or any other data network. Optionally, a user may use a web portal, mobile application, or any other data interface on their client device 400 to send and receive data with a water pumping control device 100. In preferred embodiments, a client device 400 of a user 201 may be in wireless communication with a water pumping control device 100 thereby allowing the client device to control one or more functions of the device 100 or an element of the device 100. Instructions from the client device 400 may be communicated to the processing unit 50 and the processing unit may carry out those instructions to control one or more functions of the device 100 or an element of the device 100. Exemplary instructions may include: pump 13, 14, speed override commands; target water level in a sump 99 commands; water level to bottom of sump pit 99 distance commands; sump 99 area radius; wireless internet parameters for a water pumping control device 100; or any other commands and instructions for controlling elements of the device 100.

In preferred embodiments, the radio module 53 of a water pumping control device 100 may be configured to wirelessly transmit data to a system database 330 of a server 300 via a network connection 204 with a wired or wireless network 205. This data may be collected by the processing unit 50 and sent to a server 300 which may then be filtered in various ways to be displayed to users 201 through the a client device 400, and this data may be available, preferably in raw form, for future use by other entities such as municipalities, insurance companies and others from the system database 330. In further embodiments, the processing unit 50 may accepts operating parameters and other instructions from a remote server 300, thereby allowing a user 201 to adjust settings remotely, and/or allow other authorized parties (e.g. municipalities, utilities) to optimize pumping time and flow of a water pumping control device 100.

Figure 5:
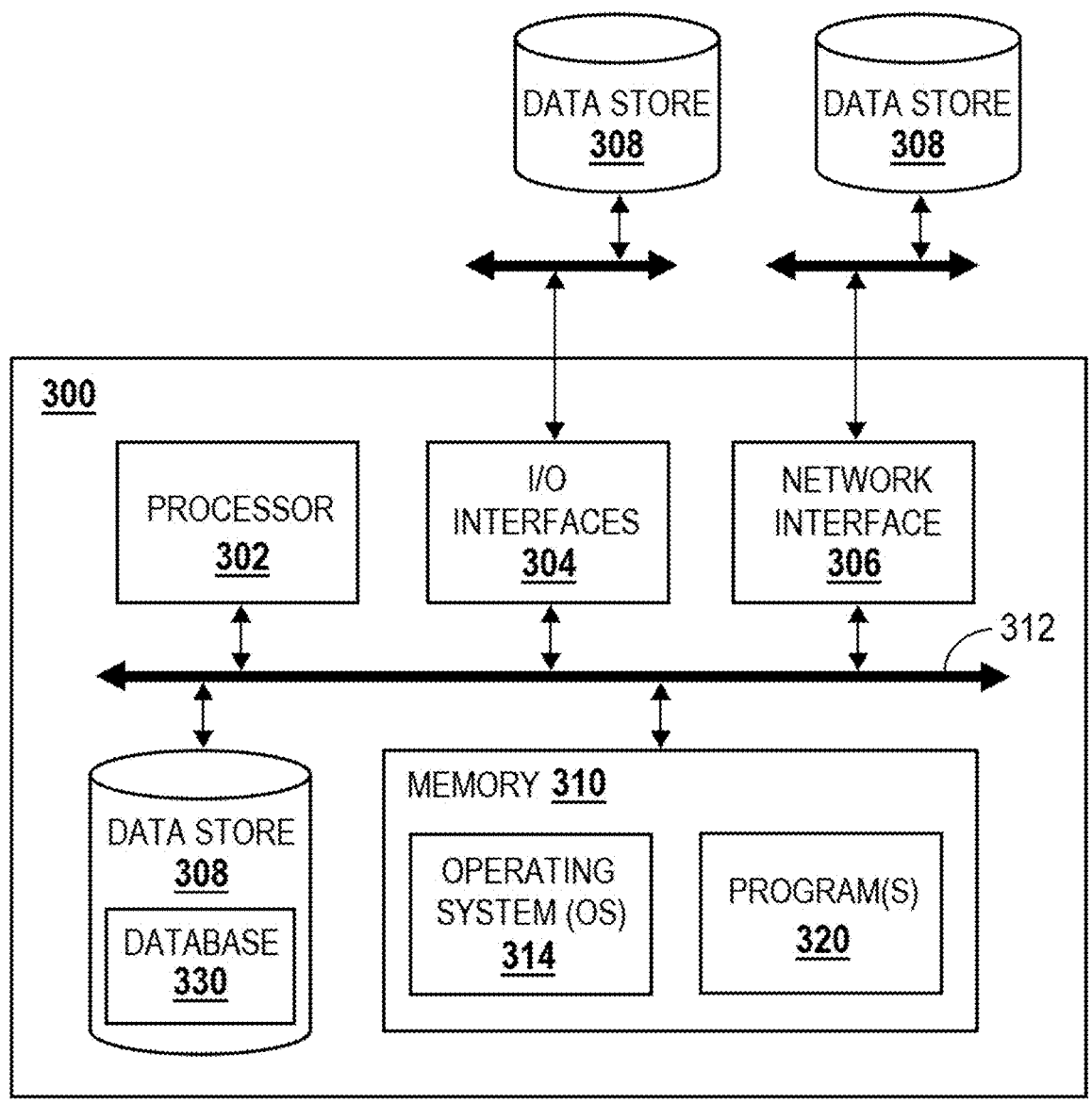
FIG. 5 illustrates a block diagram showing an example of a server which may be used by the system as described in various embodiments herein.

Referring now to FIG. 5, in an exemplary embodiment, a block diagram illustrates a server 300 of which one or more may be used in the system 200 or standalone and which may be a type of computing platform. The server 300 may be a digital computer that, in terms of hardware architecture, generally includes a processor 302, input/output (I/O) interfaces 304, a network interface 306, a data store 308, and memory 310. It should be appreciated by those of ordinary skill in the art that FIG. 5 depicts the server 300 in an oversimplified manner, and a practical embodiment may include additional components and suitably configured processing logic to support known or conventional operating features that are not described in detail herein. The components (302, 304, 306, 308, and 310) are communicatively coupled via a local interface 312. The local interface 312 may be, for example but not limited to, one or more buses or other wired or wireless connections, as is known in the art. The local interface 312 may have additional elements, which are omitted for simplicity, such as controllers, buffers (caches), drivers, repeaters, and receivers, among many others, to enable communications. Further, the local interface 312 may include address, control, and/or data connections to enable appropriate communications among the aforementioned components.

The processor 302 is a hardware device for executing software instructions. The processor 302 may be any custom made or commercially available processor, a central processing unit (CPU), an auxiliary processor among several processors associated with the server 300, a semiconductor-based microprocessor (in the form of a microchip or chip set), or generally any device for executing software instructions. When the server 300 is in operation, the processor 302 is configured to execute software stored within the memory 310, to communicate data to and from the memory 310, and to generally control operations of the server 300 pursuant to the software instructions. The I/O interfaces 304 may be used to receive user input from and/or for providing system output to one or more devices or components. User input may be provided via, for example, a keyboard, touch pad, and/or a mouse. System output may be provided via a display device and a printer (not shown). I/O interfaces 304 may include, for example, a serial port, a parallel port, a small computer system interface (SCSI), a serial ATA (SATA), a fibre channel, Infiniband, iSCSI, a PCI Express interface (PCI-x), an infrared (IR) interface, a radio frequency (RF) interface, and/or a universal serial bus (USB) interface.

The network interface 306 may be used to enable the server 300 to communicate on a network, such as the Internet, the data network 105, the enterprise, and the like, etc. The network interface 306 may include, for example, an Ethernet card or adapter (e.g., 10BaseT, Fast Ethernet, Gigabit Ethernet, 10 GbE) or a wireless local area network (WLAN) card or adapter (e.g., 802.11a/b/g/n). The network interface 306 may include address, control, and/or data connections to enable appropriate communications on the network. A data store 308 may be used to store data.

The data store 308 is a type of memory and may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 308 may incorporate electronic, magnetic, optical, and/or other types of storage media. In one example, the data store 308 may be located internal to the server 300 such as, for example, an internal hard drive connected to the local interface 312 in the server 300. Additionally in another embodiment, the data store 308 may be located external to the server 300 such as, for example, an external hard drive connected to the I/O interfaces 304 (e.g., SCSI or USB connection). In a further embodiment, the data store 308 may be connected to the server 300 through a network, such as, for example, a network attached file server. The server 300 may comprise or have access to a system database 330 which may be stored in a data store 308.

The memory 310 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 310 may incorporate electronic, magnetic, optical, and/or other types of storage media. Note that the memory 310 may have a distributed architecture, where various components are situated remotely from one another, but can be accessed by the processor 302. The software in memory 310 may include one or more software programs, each of which includes an ordered listing of executable instructions for implementing logical functions. The software in the memory 310 may include a suitable operating system (O/S) 314 and one or more programs 320.

The operating system 314 essentially controls the execution of other computer programs, such as the one or more programs 320, and provides scheduling, input-output control, file and data management, memory management, and communication control and related services. The operating system 314 may be, for example Windows NT, Windows 2000, Windows XP, Windows Vista, Windows 7, Windows 8, Windows 10, Windows Server 2003/2008 (all available from Microsoft, Corp. of Redmond, Wash.), Solaris (available from Sun Microsystems, Inc. of Palo Alto, Calif.), LINUX (or another UNIX variant) (available from Red Hat of Raleigh, N.C. and various other vendors), Android and variants thereof (available from Google, Inc. of Mountain View, Calif.), Apple OS X and variants thereof (available from Apple, Inc. of Cupertino, Calif.), or the like. The one or more programs 320 may be configured to implement the various processes, algorithms, methods, techniques, etc. described herein.

Figure 6:
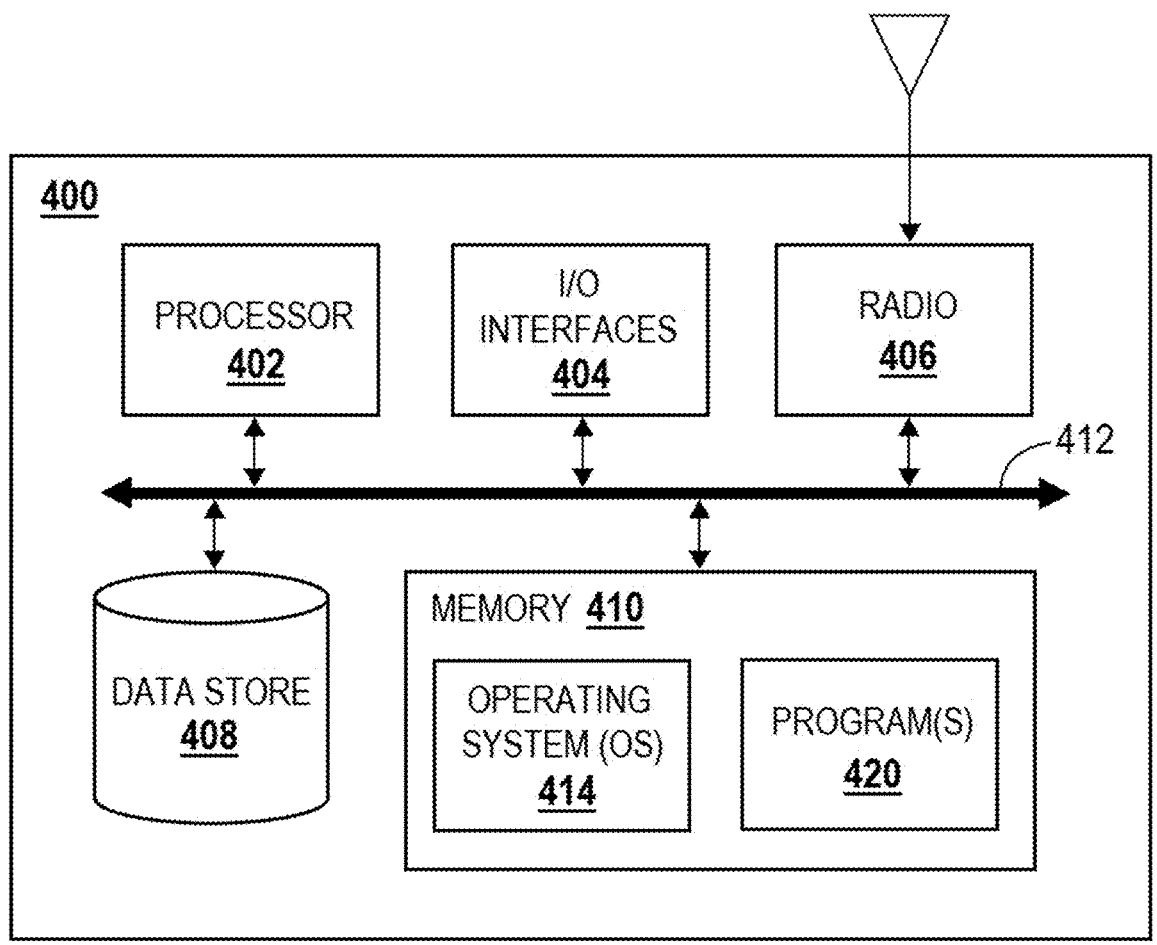
FIG. 6 shows a block diagram illustrating an example of a client device which may be used by the system as described in various embodiments herein.

Referring to FIG. 6, in an exemplary embodiment, a block diagram illustrates a client device 400 of which one or more may be used in the system 200 or the like and which may be a type of computing platform. The client device 400 can be a digital device that, in terms of hardware architecture, generally includes a processor 402, input/output (I/O) interfaces 404, a radio 406, a data store 408, and memory 410. It should be appreciated by those of ordinary skill in the art that FIG. 6 depicts the client device 400 in an oversimplified manner, and a practical embodiment may include additional components and suitably configured processing logic to support known or conventional operating features that are not described in detail herein. The components (402, 404, 406, 408, and 410) are communicatively coupled via a local interface 412. The local interface 412 can be, for example but not limited to, one or more buses or other wired or wireless connections, as is known in the art. The local interface 412 can have additional elements, which are omitted for simplicity, such as controllers, buffers (caches), drivers, repeaters, and receivers, among many others, to enable communications. Further, the local interface 412 may include address, control, and/or data connections to enable appropriate communications among the aforementioned components.

The processor 402 is a hardware device for executing software instructions. The processor 402 can be any custom made or commercially available processor, a central processing unit (CPU), an auxiliary processor among several processors associated with the client device 400, a semiconductor-based microprocessor (in the form of a microchip or chip set), or generally any device for executing software instructions. When the client device 400 is in operation, the processor 402 is configured to execute software stored within the memory 410, to communicate data to and from the memory 410, and to generally control operations of the client device 400 pursuant to the software instructions. In an exemplary embodiment, the processor 402 may include a mobile optimized processor such as optimized for power consumption and mobile applications.

The I/O interfaces 404 can be used to receive data and user input and/or for providing system output. User input can be provided via a plurality of I/O interfaces 404, such as a keypad, a touch screen, a camera, a microphone, a scroll ball, a scroll bar, buttons, bar code scanner, voice recognition, eye gesture, and the like. System output can be provided via a display screen such as a liquid crystal display (LCD), touch screen, and the like. The I/O interfaces 404 can also include, for example, a global positioning service (GPS) radio, a serial port, a parallel port, a small computer system interface (SCSI), an infrared (IR) interface, a radio frequency (RF) interface, a universal serial bus (USB) interface, and the like. The I/O interfaces 404 can include a graphical user interface (GUI) that enables a user to interact with the client device 400. Additionally, the I/O interfaces 404 may be used to output notifications to a user and can include a speaker or other sound emitting device configured to emit audio notifications, a vibrational device configured to vibrate, shake, or produce any other series of rapid and repeated movements to produce haptic notifications, and/or a light emitting diode (LED) or other light emitting element which may be configured to illuminate to provide a visual notification.

The radio 406 enables wireless communication to an external access device or network. Any number of suitable wireless data communication protocols, techniques, or methodologies can be supported by the radio 406, including, without limitation: RF; IrDA (infrared); Bluetooth; ZigBee (and other variants of the IEEE 802.15 protocol); IEEE 802.11 (any variation); IEEE 802.16 (WiMAX or any other variation); Direct Sequence Spread Spectrum; Frequency Hopping Spread Spectrum; Long Term Evolution (LTE); cellular/wireless/cordless telecommunication protocols (e.g. 3G/4G, etc.); wireless home network communication protocols; paging network protocols; magnetic induction; satellite data communication protocols; wireless hospital or health care facility network protocols such as those operating in the WMTS bands; GPRS; proprietary wireless data communication protocols such as variants of Wireless USB; and any other protocols for wireless communication.

The data store 408 may be used to store data and is therefore a type of memory. The data store 408 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 408 may incorporate electronic, magnetic, optical, and/or other types of storage media.

The memory 410 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 410 may incorporate electronic, magnetic, optical, and/or other types of storage media. Note that the memory 410 may have a distributed architecture, where various components are situated remotely from one another, but can be accessed by the processor 402. The software in memory 410 can include one or more software programs 420, each of which includes an ordered listing of executable instructions for implementing logical functions. In the example of FIG. 6, the software in the memory system 410 includes a suitable operating system (O/S) 414 and programs 420.

The operating system 414 essentially controls the execution of other computer programs, and provides scheduling, input-output control, file and data management, memory management, and communication control and related services. The operating system 414 may be, for example, LINUX (or another UNIX variant), Android (available from Google), Symbian OS, Microsoft Windows CE, Microsoft Windows 7 Mobile, Microsoft Windows 10, iOS (available from Apple, Inc.), webOS (available from Hewlett Packard), Blackberry OS (Available from Research in Motion), and the like.

The programs 420 may include various applications, add-ons, etc. configured to provide end user functionality with the client device 400. For example, exemplary programs 420 may include, but not limited to, a web browser, social networking applications, streaming media applications, games, mapping and location applications, electronic mail applications, financial applications, and the like. In a typical example, the end user typically uses one or more of the programs 420 along with a network 105 to manipulate information of the system 200 and to send and receive data from a water pumping control device 100 and/or a system server 300.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following claims.

What is claimed is:

1. A water pumping control device, the device comprising:
    a primary power source configured to provide a primary power input to a processing unit;
    a secondary power source configured to provide a secondary power input to the processing unit;
    a primary pump in communication with the processing unit, the primary pump being variable in speed, and the primary pump having a maximum speed;
    a secondary pump in communication with the processing unit, the secondary pump being variable speed; and
    a water level sensor configured to provide a water level input to the processing unit, wherein the processing unit is configured to activate the primary pump when the water level input reaches a threshold value, wherein the processing unit is configured to increase the speed of the primary pump when the water level input reaches the threshold value and when the water level input is increasing, wherein the processing unit is configured to activate the secondary pump when the water level input reaches the threshold value, when the water level input is increasing, and when the primary pump is at maximum speed.

2. The device of claim 1, wherein the processing unit is configured to provide the secondary power input to a pump selected from the group consisting of the primary pump and the secondary pump when the primary power source is not providing a primary power input to the processing unit.

3. The device of claim 1, further comprising a radio module.

4. The device of claim 3, wherein the processing unit is configured to wirelessly transmit data via the radio module, the data describing a power source failure when a power input selected from the group consisting of the primary power input and the secondary power input is not provided to the processing unit.

5. The device of claim 3, wherein the processing unit is configured to wirelessly transmit data via the radio module, the data describing a pump failure when a pump selected from the group consisting of the primary pump and the secondary pump is not in communication with the processing unit.

6. The device of claim 3, wherein the processing unit is configured to wirelessly transmit data via the radio module, the data describing water level input and describing pump speed data for a pump selected from the group consisting of the primary pump and the secondary pump.

7. The device of claim 1, wherein the water level sensor is an ultrasonic water level sensor.

8. The device of claim 1, further comprising a temperature sensor configured to provide temperature data to the processing unit.

9. The device of claim 8, wherein processing unit is configured to cause a pump selected from the group consisting of the primary pump and the secondary pump to pulse when the temperature sensor provides temperature data describing a temperature below 33 degrees Fahrenheit.

10. The device of claim 1, wherein the primary power source is in communication with an alternating current power supply, and wherein secondary power source comprises a battery.

11. The device of claim 1, further comprising a salinity sensor.

12. A water pumping control system, the system comprising:
    a primary power source configured to provide a primary power input to a processing unit;
    a secondary power source configured to provide a secondary power input to the processing unit;
    a primary pump in communication with the processing unit, the primary pump being variable in speed, and the primary pump having a maximum speed;
    a secondary pump in communication with the processing unit, the secondary pump being variable speed;
    a water level sensor configured to provide a water level input to the processing unit; and
    a radio module operable by the processing unit, the radio module configured to communicate with a server, wherein the processing unit is configured to activate the primary pump when the water level input reaches a threshold value, wherein the processing unit is configured to increase the speed of the primary pump when the water level input reaches the threshold value and when the water level input is increasing, wherein the processing unit is configured to activate the secondary pump when the water level input reaches the threshold value, when the water level input is increasing, and when the primary pump is at maximum speed.

13. The system of claim 12, wherein the processing unit is configured to provide the secondary power input to a pump selected from the group consisting of the primary pump and the secondary pump when the primary power source is not providing a primary power input to the processing unit.

14. The system of claim 12, wherein the processing unit is configured to wirelessly transmit data via the radio module, the data describing a power source failure when a power input selected from the group consisting of the primary power input and the secondary power input is not provided to the processing unit.

15. The system of claim 12, wherein the processing unit is configured to wirelessly transmit data via the radio module, the data describing a pump failure when a pump selected from the group consisting of the primary pump and the secondary pump is not in communication with the processing unit.

16. The system of claim 12, wherein the processing unit is configured to wirelessly transmit data via the radio module, the data describing water level input and describing pump speed data for a pump selected from the group consisting of the primary pump and the secondary pump.

17. The system of claim 12, wherein the water level sensor is an ultrasonic water level sensor.

18. The system of claim 12, further comprising a temperature sensor configured to provide temperature data to the processing unit.

19. The system of claim 18, wherein processing unit is configured to cause a pump selected from the group consisting of the primary pump and the secondary pump to pulse when the temperature sensor provides temperature data describing a temperature below 33 degrees Fahrenheit.

20. The system of claim 12, wherein the primary power source is in communication with an alternating current power supply, and wherein secondary power source comprises a battery.

* * * * *